(12) United States Patent
Judge et al.

(10) Patent No.: US 10,819,136 B2
(45) Date of Patent: Oct. 27, 2020

(54) SYSTEM AND METHOD OF ADAPTIVE HIGH VOLTAGE TRANSIENT CONTROL FOR EXTERNAL LOADS

(71) Applicant: Ford Global Technologies, LLC, Dearborn, MI (US)

(72) Inventors: Alan Francis Judge, Farmington Hills, MI (US); Jeff Raymond Mohr, Shelby Township, MI (US); John G. Fraser, St. Joachim (CA); James Brian Keyse, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/277,655

(22) Filed: Feb. 15, 2019

(65) Prior Publication Data

US 2020/0266653 A1   Aug. 20, 2020

(51) Int. Cl.
*H02J 7/24* (2006.01)
*H02P 9/30* (2006.01)
*H02J 7/00* (2006.01)
*H02J 7/14* (2006.01)

(52) U.S. Cl.
CPC ............. *H02J 7/24* (2013.01); *H02J 7/007* (2013.01); *H02J 7/1446* (2013.01); *H02P 9/30* (2013.01)

(58) Field of Classification Search
CPC .......... H02J 7/242; H02J 7/007; H02J 7/1446; H02J 7/24; H02P 9/30
See application file for complete search history.

(56) References Cited

U.S. PATENT DOCUMENTS

| | | | |
|---|---|---|---|
| 5,216,350 A | 6/1993 | Judge | |
| 5,719,485 A | 2/1998 | Asada | |
| 8,963,509 B2 | 2/2015 | Micko | |
| 9,866,053 B2 | 1/2018 | Alfermann | |
| 2014/0167707 A1* | 6/2014 | Brunstetter | H02J 7/16 320/162 |
| 2016/0141894 A1* | 5/2016 | Beaston | H02J 7/0014 320/103 |
| 2017/0033717 A1 | 2/2017 | Ansbacher | |
| 2018/0123357 A1* | 5/2018 | Beaston | H01M 10/482 |

FOREIGN PATENT DOCUMENTS

| | | |
|---|---|---|
| CN | 102902214 A | 1/2013 |
| CN | 202772829 A | 3/2013 |

\* cited by examiner

*Primary Examiner* — Viet P Nguyen
(74) *Attorney, Agent, or Firm* — Frank Lollo; Eversheds Sutherland (US) LLP

(57) ABSTRACT

A vehicle includes first loads, a power source, and a processor coupled to the power source. Each of the first loads is configured to generate a fault signal indicative of an occurrence of an action performed by said first load to mitigate a voltage transient event. The processor is configured to, in response to a second different load being electrically coupled to the power source: control a voltage available within the power source based on calibration parameters; and in response to receiving the fault signal, adjust at least one of the calibration parameters.

16 Claims, 3 Drawing Sheets

SYSTEM AND METHOD OF ADAPTIVE HIGH VOLTAGE TRANSIENT CONTROL FOR EXTERNAL LOADS

TECHNICAL FIELD

The present disclosure generally relates to a system and method of adaptive high voltage transient control for external loads and, more specifically, a system and method of adaptive high voltage transient control for mitigating faults occurring within a vehicle due to activation of external loads.

BACKGROUND

Vehicles include a control system for mitigating high voltage transient events induced by sudden electrical disconnections between loads and a vehicle power source. While said control system mitigates such events by lowering a voltage set point to a predetermined level, such solution may not be suitable for external loads, such as snowplows having different size and weight, which cause variations in the load current and voltage.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle and method are described herein. The example vehicle includes first loads, a power source, and a processor coupled to the power source. Each of the first loads is configured to generate a fault signal indicative of an occurrence of an action performed by said first load to mitigate a voltage transient event. The processor is configured to, in response to a second different load being electrically coupled to the power source: control a voltage available within the power source based on calibration parameters; and in response to receiving the fault signal, adjust at least one of the calibration parameters.

The example method includes generating, from each of first loads of a vehicle, a fault signal indicative of an occurrence of an action performed by said first load to mitigate a voltage transient event; responsive to a second different load separate from the vehicle being electrically coupled to a power source of the vehicle: controlling a voltage available within the power source based on calibration parameters; and responsive to receiving the fault signal, adjusting at least one of the calibration parameters.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
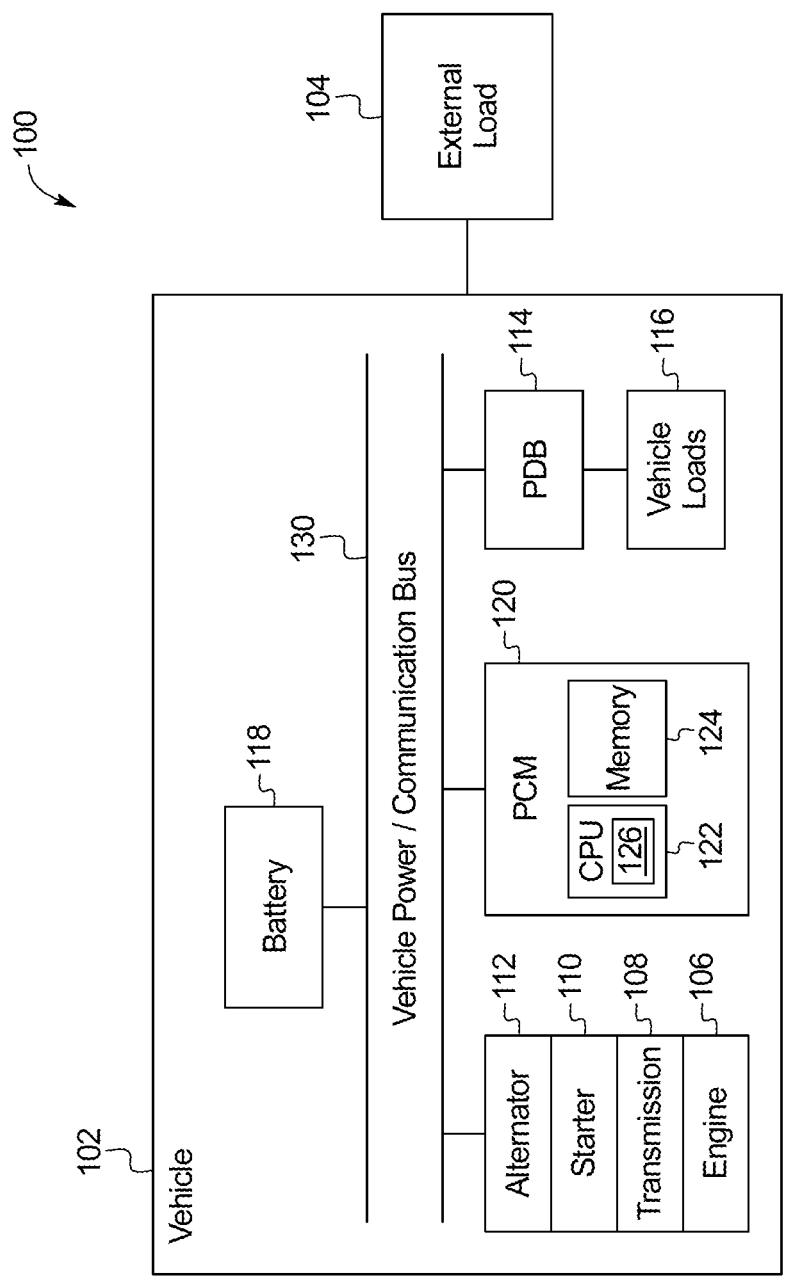
FIG. 1 illustrates a vehicle system in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include power systems for providing power to one or more subsystems and/or devices that are electrically coupled thereto. A typical vehicle power systems includes an alternator that converts mechanical energy to electrical energy in the form of a current. Generally, an alternator is a self-regulating device. The amount of power required by a load causes the alternator to automatically adjust itself and generate an output voltage that is suitable for a range of loads having different power requirements. However, because the alternator is a mechanical device made up of, among other things, a rotor and stator windings, it is sensitive to large load disturbances. Specifically, when a load is quickly removed, the voltage generated by the alternator is temporality subjected to a sharp increase in that the alternator is generating power for the load that is no longer electrically coupled to the power system. If the magnitude of such voltage spike is severe, the voltage generated by the alternator may dip outside the voltage range in which the one or more subsystems and/or devices currently electrically coupled to the alternator operate, thus, causing said subsystems and/or devices to shut down. One remedy to such issue is to detect large departures in load and ensure that the load departure was substantial enough to cross a threshold. Once these conditions are detected, a current set point is incrementally decreased to a voltage set point that is deemed nominal if the load was to suddenly disconnect. Subsequently, an algorithm is applied to release the set point back to a nominal system voltage. Details of such remedy is described with reference to U.S. Patent Application Publication No. 2017/0033717 A1, which is incorporated herein in its entirety. While this approach eliminates high voltage transients in vehicle power systems, it may not be suitable for external loads, such as snowplows having different size and weight, which cause variations in the load current and voltage.

As disclosed herein, a vehicle includes vehicle loads, a power source, a vehicle power/communication bus, and a power train control module (PCM). When a voltage transient event occurs in at least one of the vehicle loads, one or more modules and/or devices (e.g., electronic control units (ECU)) electrically coupled thereto are affected by the voltage transient event. These modules and/or devices may, in response, perform an action to mitigate the electrical disturbances caused by the voltage transient event and generate a fault signal for each instance in which said action has occurred. As described herein, a fault signal is indicative of an occurrence in which a vehicle module and/or device performs an action to mitigate the electrical disturbance caused by a voltage transient event. When an external load, such as a snowplow, is electrically coupled to the power source, the PCM controls a voltage available within the power source based on calibration parameters. If at least one of the modules and/or devices generates the fault signal, the PCM adjusts at least one of the calibration parameters such that the vehicle loads no longer generate any fault signals or the number of fault signals generated by the modules and/or devices are minimized. The PCM adjusts the calibration parameters by comparing the current total number of fault signals to the latest saved total number of fault signals. If the current adjustment of the calibration parameters yields lower number of total number of fault signals than the previous adjustment of the calibration parameters, the PCM continues to adjust the calibration parameters in a similar manner as the previous adjustment. If no fault signals are generated by the modules and/or devices, the PCM determines a number of time the voltage available in the power source exceeds a system voltage. If said voltage exceeds the system voltage for a predetermine amount of occurrences within a predetermined amount of time, the PCM adjusts at least one of the calibration parameters.

FIG. 1 illustrates a vehicle system 100 in accordance with this disclosure. The vehicle system 100 includes a vehicle 102 and an external load 104. The vehicle 102 may be a standard gasoline powered vehicle, a hybrid vehicle, an electric vehicle, a fuel cell vehicle, and/or any other mobility implement type of vehicle. The vehicle 102 may be a semi-autonomous vehicle (e.g., some routine motive functions, such as parking, are controlled by the vehicle 100), or an autonomous vehicle (e.g., motive functions are controlled by the vehicle 100 without direct driver input). The vehicle 102 includes an engine 106, a transmission 108, a starter motor 110, an alternator 112, a power distribution box (PDB) 114, vehicle loads 116, a battery 118, and a PCM 120. These elements may be communicatively and electrically coupled to each other via a vehicle power/communication bus 130. The vehicle power/communication bus 130 includes a vehicle data bus (not illustrated). The vehicle data bus may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The engine 106 may be coupled to a transmission 108 to propel the vehicle 102. The engine 106 may be coupled to a starter motor 110 and an alternator 112. The starter motor 110 may be a DC electric motor or may be an AC motor. The starter motor 110 and the alternator 112 may be a single electric machine that is configurable to either generate an output voltage when configured as an alternator 112, or output a torque to rotate the engine 106 when configured as a starter. The PCM 120 may control the alternator 112. A portion or more of the energy output of the alternator 112 may be stored in a DC battery 118, such as a lead-acid battery, Li-ion battery, or other vehicle battery. The energy generated from the alternator 112 may be distributed via a Power Distribution Box (PDB) 114. The PDB 114 is electrically coupled to one or more vehicle loads 116. The vehicle loads 116 include various vehicle modules and accessories such as exterior lighting, interior lighting, Passive Entry Passive Start (PEPS) system, infotainment system, an electronic instrument cluster, a body control module (BCM), a HVAC modules configured to provide control and monitoring of heating and cooling system components (e.g., compressor clutch and blower fan control, temperature sensor information, etc.), etc. One or more of the vehicle loads 116 may include and/or be electrically connected to at least one ECU (not illustrated). Each of the ECUs is operable to generate a fault signal indicative of an occurrence of an action performed by said ECU in efforts to mitigate electrical disturbance caused by a high voltage transient event occurring within the vehicle power/communication bus 130. For example, said action may be defined by an event in which an ECU causes a vehicle load 120 to temporarily disconnect from the vehicle's power source. The PDB 114 is operable to distribute power received from the alternator 112 to each of the vehicle loads 116 based on instructions received from the PCM 120. The PDB 114 may be controlled such that the voltage level distributed to each of the vehicle loads 116 and the duration in which said voltage level is distributed varies. It should be appreciated that the illustrated vehicle system 100 is merely an example, and more, fewer, and/or differently located elements may be used.

The PCM 120 includes a processor or controller 122 and memory 124. The processor or controller 122 and the memory 124 may define an ECU. In the illustrated example, the PCM 120 is structured to include a high voltage transient controller 126. Alternatively, in some examples, the high voltage transient controller 126 may be incorporated into another ECU with its own processor and memory. The processor or controller 122 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 124 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 124 includes multiple kinds of memory, particularly volatile memory and non-volatile memory.

The memory 124 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 124, the computer readable medium, and/or within the processor 124 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The PCM 120 may operate to execute computer-executable instructions to control various vehicle systems including the engine 106, the transmission 108, and other vehicle loads 116. Said computer-executable instructions may be compiled or interpreted from computer programs created using a variety of programming languages and/or technologies, including, without limitation and either alone or in combination, assembly, Java, C, C++, C #, Objective C, Fortran, Pascal, Java Script, Python, Perl, and PL/SQL.

The external load 104 is coupled to the vehicle 102. The external load 104 may be communicatively and electrically coupled to the vehicle power/communication bus 130 via the PDB 114. The external load 104 may be an aftermarket product that is connectable to the vehicle 102. The external load 104 is operable to perform a function based on power received from the vehicle 102. For example, the external load 104 be a snowplow.

Operations of the high voltage transient controller 126 will be described in detail herein.

When the vehicle's ignition is turned on, the high voltage transient controller 126 initiates an external load 104 control process. At the outset of the external load 104 control process, it is assumed that the external load 104 is electrically disconnected from the vehicle's power source. It should be interpreted that the vehicle's power source may refer to the alternator 112. When the external load control process is initiated, the default values of external load calibration parameters are loaded. The external load calibration parameters define various threshold values/ranges for controlling voltage available within the alternator 112 (herein referred as alternator voltage) over time in preparation for an event in which the external load 104 is electrically disconnected from the vehicle's power source. Details of the external load calibration parameters will be described with reference to FIG. 2.

Figure 2:
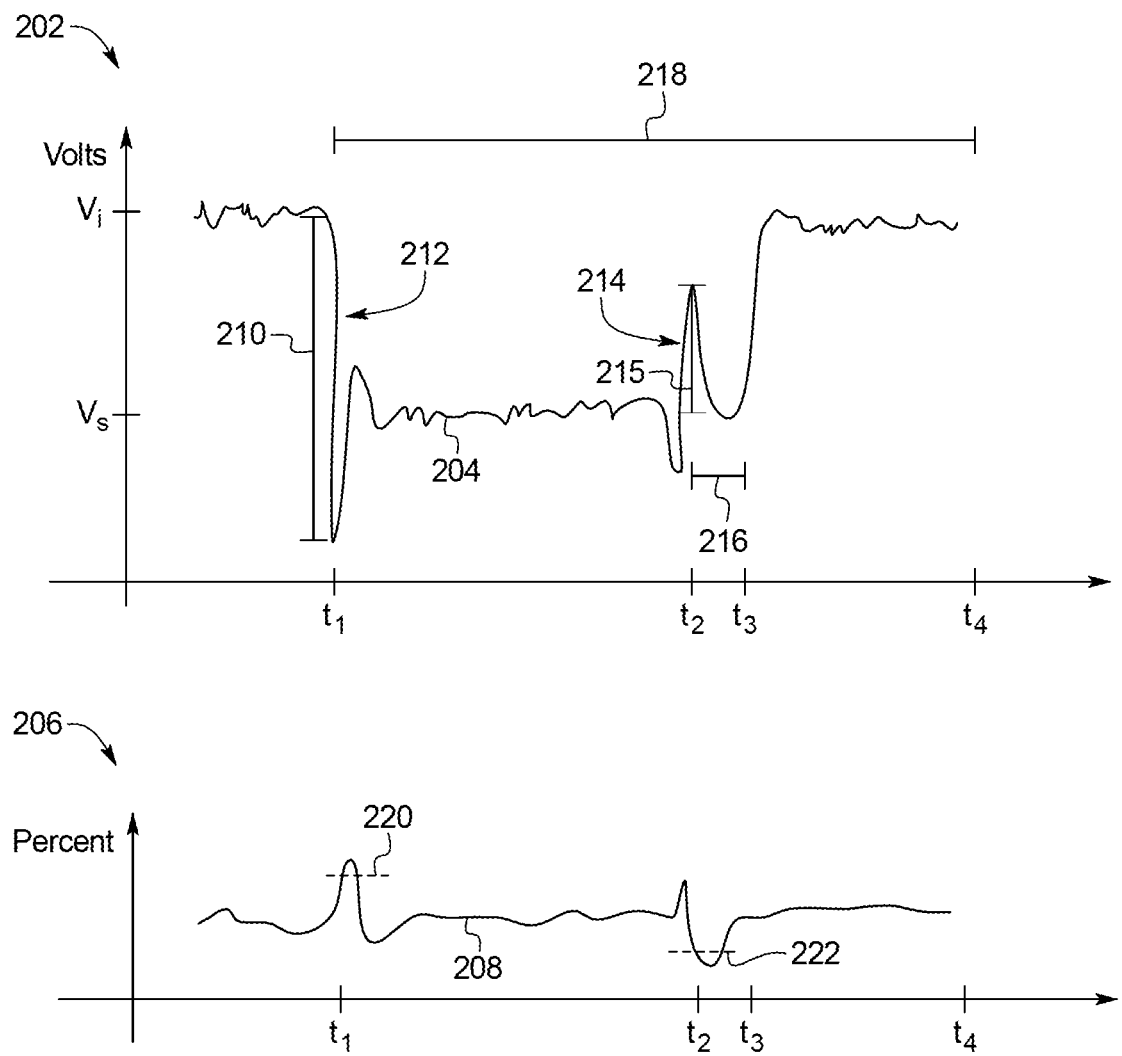
FIG. 2 illustrates example graphs of changes of alternator voltage and its field current over a period.

FIG. 2 illustrates example graphs of changes of alternator voltage 202 and its field current 204 over a period including a time point in which the external load 104 is electrically connected to the vehicle's power source and a subsequent time point in which the external load 104 is electrically disconnected from the vehicle's power source.

The top graph 202 illustrates the changes in the alternator voltage 204. At t1, the external load 104 is electrically connected to the vehicle's power source and is activated to perform its function. The electrical activation of the external load 104 causes an instantaneous drop in the alternator voltage 204 and a sharp increase in the duty cycle thereof. In response, the high voltage transient controller 126 instructs the alternator 112 to lower its initial voltage Vi to a lower voltage set point value Vs in preparation for the load departure. From t1, the alternator voltage 204 temporarily dips negatively to indicate that a negative voltage spike has occurred. From t1 to t2, the alternator voltage 204 stabilizes around the lower voltage set point value Vs. At t2, the external load 104 is electrically disconnected, and the alternator voltage 204 temporarily reaches a voltage level higher than the lower voltage set point value Vs to indicate a positive voltage spike. From t2 to t3, the high voltage transient controller 126 allows a short delay 216 to pass such that the alternator voltage 204 is lowered to the lower voltage set point Vs. From t3 to t4, the high voltage transient controller 126 causes the alternator voltage 204 to increase to and stabilize around the initial voltage level.

The bottom graph 206 illustrates the changes in the field current 208 (i.e., duty cycle) of the alternator voltage 204. The changes in the field current 208 of the alternator voltage 204 has an inverse relationship with the voltage level of the alternator voltage 204.

The external load calibration parameters include a negative spike range 210, the lower voltage set point value Vs, a negative voltage rate 212, a positive voltage rate 214, a positive spike range 215, a short delay 216, a maximum lower set point period 218, an upper field current value 220, and a lower field current value 222. In view, of FIG. 1: (1) the negative spike range 210 is a maximum range in which the alternator voltage 204 is allowed to drop from the initial voltage level Vi to indicate the negative voltage spike; (2) the lower voltage set point value Vs is the voltage level in which the alternator voltage 204 should stabilize in preparation for the positive voltage spike; (3) the negative voltage rate 212 is the rate in which the alternator voltage 204 is allowed drop; (4) the positive voltage rate 214 is the rate in which the alternator voltage 204 is allowed to increase from the lower voltage set point value Vs; (5) the short delay 216 is a period set for allowing the positive voltage spike to pass (i.e., t2 to t3); (6) the maximum lower set point period 218 is a maximum allowed time to verify a voltage spike; (7) the maximum field current value 220 refers to a maximum alternator percent field current required to verify the negative voltage spike; and (8) the minimum field current value 222 refers to a minimum alternator percent field current required to verify the positive voltage spike. The negative voltage spike and the positive voltage spike are used as indicators as to determine the initiation of the preparation for the external load 104 departure and the actual occurrence of the load departure.

Once the default values of the external load calibration parameters are loaded, the high voltage transient controller 126 sets: (1) a maximum system voltage threshold; (2) a maximum fault loop time; and (3) a maximum number of fault events.

When the external load 104 is activated (i.e., the external load 104 is electrically coupled to the vehicle's power source), the high voltage transient controller 126 initiates a fault event counter. It should be appreciated that the fault event counter is reset prior to its initiation. The high voltage transient controller 126 determines whether a large load change has occurred by monitoring the alternator voltage 204. If a large load change is detected, the high voltage transient controller 126 may perform a control process including: (1) determining whether a large load departure is impending; (2) determining whether the large load departure is substantial enough to satisfy a threshold; and (3) incrementally decreasing the alternator voltage 204 based on the determinations in (1) and (2). This process is described in detail with reference to U.S. Patent Application Publication No. 2017/0033717 A1. Therefore, details thereof will not be described herein for the sake of brevity. It should be appreciated that in alternative examples, the high voltage transient controller 126 may skip said vehicle process.

If the high voltage transient controller 126 determines that the large load departure is not impending and determines that the large load departure is not substantial enough to cross a threshold, the high voltage transient controller 126 stores the current values of the external load calibration parameters and initiates a fault loop timer. It should be appreciated that the fault loop timer is reset prior to its initiation. During this time, the high voltage transient controller 126 receives, via the vehicle data bus (e.g., CAN bus), one or more fault signals generated by one or more of ECUs electrically coupled to the vehicle loads 116, and stores a total number of fault signals received at this time.

If at least one fault signal is detected, the high voltage transient controller 126, performs an adjustment of at least one of the external load calibration parameters. For example, the high voltage transient controller 126 may cause the current lower voltage set point value Vs to increase. For each instance in which the external load 104 is activated, the high voltage transient controller 126 repeats the aforementioned steps subsequent to the activation of the external load 104. The high voltage transient controller 126 compares the current total number of fault signals to the latest saved total number of fault signals. If the current adjustment to the external load calibration parameters yields a total number of fault signals that is less than the latest saved total number of fault signals, the high voltage transient controller 126 continues to make an adjustment to the external load calibration parameters in a similar manner as its prior adjustment. For example, if increasing the lower voltage set point value Vs to a higher value yielded a lower total number of fault signals, the high voltage transient controller 126 may again increase the lower voltage set point value Vs to a higher value for the subsequent adjustment. This process may continue until no fault signals are detected or the current total number of fault signals is minimized. However, if increasing the lower voltage set point value Vs to a higher value yielded a higher total number of fault signals, the high voltage transient controller 126 may adjust at least one of the external load calibration parameters based on other aspects. Said other aspects may include different magnitudes of values, different number, and/or different combination of the external load calibration parameters. For example, if increasing the lower voltage set point value Vs to the higher value yielded a higher total number of fault signals, the high voltage transient controller 126 may decrease the lower voltage set point value Vs to a lower value for the subsequent adjustment.

In some examples, for each specific external load 104, the high voltage transient controller 126 may store an optimal setting of the external load calibration parameters that yields no fault signals or a minimum number of fault signals and load said setting each time said external load 104 is electrically coupled to the vehicle's power source.

If no fault signals are detected, the high voltage transient controller 126 determines whether the alternator voltage 204 has exceeded the maximum system voltage threshold. If so, the fault event counter is incremented. While the fault loop timer is running, the high voltage transient controller 126 repeats the steps performed subsequent to the initiation of the fault loop timer. If the fault event counter reaches the maximum number of fault events before the fault loop timer lapses, the high voltage transient controller 126 performs the adjustment of at least one of the external load calibration parameters, as discussed above. If the fault event counter fails to reach the maximum number of fault events at the time when the fault loop timer lapses, the high voltage transient controller 126: (1) exits the loop; (2) resets the loop timer and the fault event counter; and (3) resumes supplying power to the external load 104 without manipulating any of the external load calibration parameters.

Since the high voltage transient controller 126 utilize feedback from the vehicle loads 116 to adjust changes in the alternator voltage 204 over time, the high voltage transient controller 126 may operate the external load 104s while minimizing fault events and undesirable high voltage transients occurring within the vehicle loads 116.

In some examples, if the external load 104 is a snowplow, the high voltage transient controller 126 initiates the external load 104 control process only when an engine coolant temperature and a battery electrolyte temperature satisfy threshold temperatures.

Figure 3:
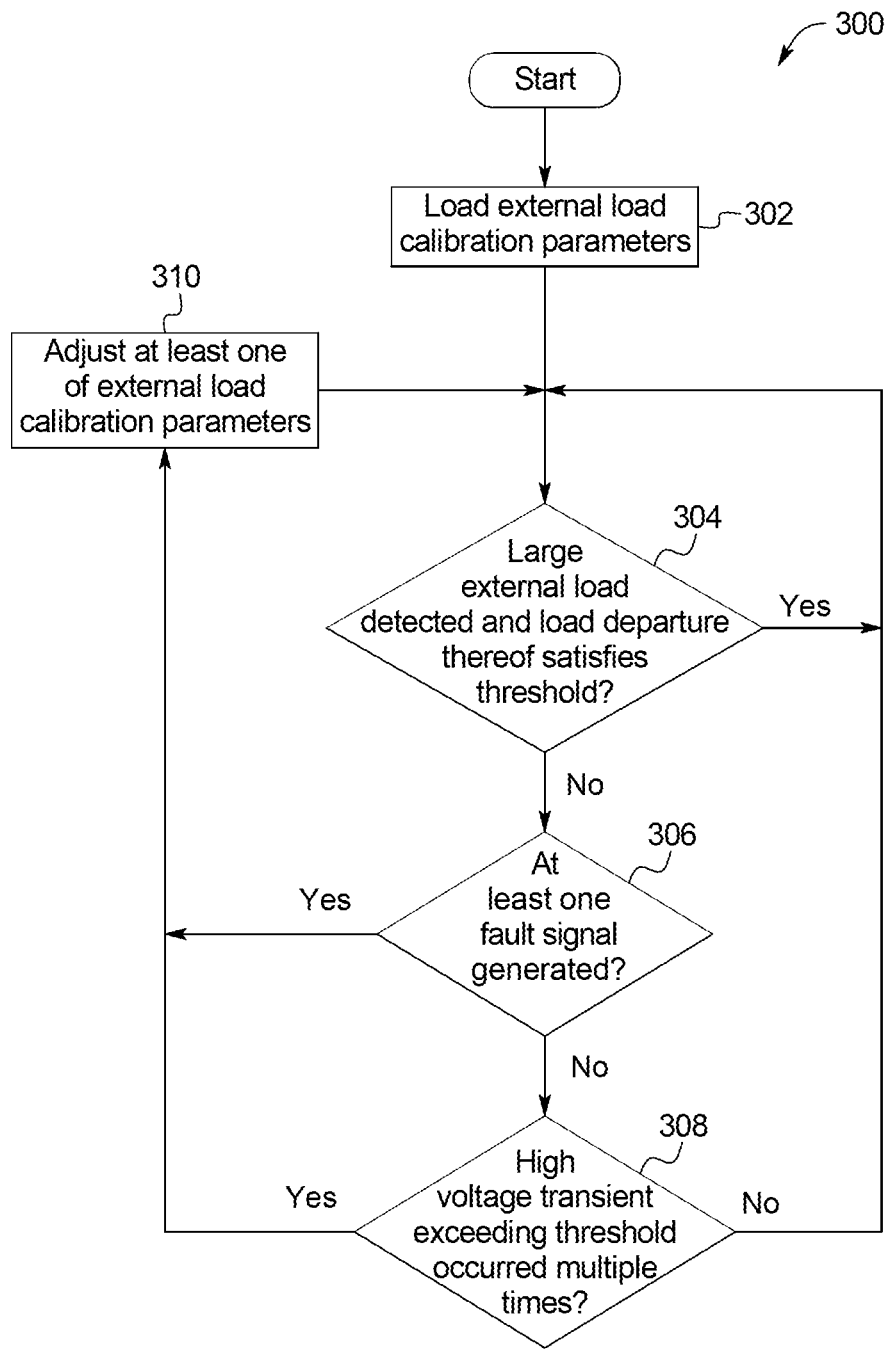
FIG. 3 illustrates a flowchart of a method for performing an external load control.

FIG. 3 illustrates a flowchart 300 of a method for performing an external load 104 control, which may be executed by the high voltage transient controller 126 of FIG. 1.

At block 302, the high voltage transient controller 126 loads the external load calibration parameters.

At block 304, the high voltage transient controller 126 determines whether: (1) a load is electrically coupled to the vehicle's power source; (2) the load satisfies a threshold (thus, being categorized as an external load 104); and (3) the load departure thereof satisfies a threshold. If all of these conditions are true, the method returns to block 304. Otherwise, the method continues to block 306.

At block 306, the high voltage transient controller 126 monitors the vehicle loads 116 to determine whether at least one fault signal is generated from one or more ECUs electrically coupled to the vehicle loads 116. If so, the method continues to block 310. Otherwise, the method continues to block 308.

At block 308, the high voltage transient controller 126 tracks each instance in which the alternator voltage 204 has exceeded a maximum system voltage. The high voltage transient controller 126 determines whether the number of occurrences in which the alternator voltage 204 has exceeded the maximum system voltage reaches a threshold value before a predetermined amount of time elapses. If so, the method continues to block 310. Otherwise, the method returns to block 302.

At block 310, the high voltage transient controller 126 adjusts at least one of the external load calibration parameters. The high voltage transient controller 126 may render an adjustment to the external load calibration parameters to yield a minimum amount of fault signals received at block 306 by comparing the current total number of fault signals to the latest saved total number of fault signals.

The flowchart 300 of FIG. 3 is representative of machine readable instructions stored in memory (such as the memory of FIG. 1) that comprise one or more programs that, when executed by a processor (such as the processor 122 of FIG. 1), cause the vehicle 102 to implement the high voltage transient controller 126 of FIG. 1. Further, although the example program(s) is/are described with reference to the flowchart 300 of FIG. 3, many other methods of implementing the high voltage transient controller 126 may alternatively be used. For example, the order of execution of the blocks may be changed, and/or some of the blocks described may be changed, eliminated, and/or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a first load;
   a power source;
   an electronic control unit (ECU) electrically coupled to the first load and configured to generate a fault signal indicative of an occurrence of an action performed by the ECU to mitigate a voltage transient event, wherein the action comprises electrically connecting or disconnecting the first load from the power source; and
   a processor coupled to the power source and configured to adjust, based on a second load being electrically coupled to the power source and based on receiving the fault signal, a calibration parameter, wherein the calibration parameter defines a threshold for controlling a voltage available within the power source, wherein the calibration parameter comprises at least one of:
   a first rate in which the voltage drops when the second load is electrically coupled to the power source;
   a first maximum range in which the voltage drops when the second load is electrically coupled to the power source;
   a first field current level in which a duty cycle of the voltage reaches when the second load is electrically coupled to the power source;
   a voltage set point in which the voltage is maintained subsequent to a voltage drop;
   a second rate in which the voltage rises when the second load electrically disconnected from the power source;
   a second maximum range in which the voltage rises when the second load is electrically disconnected from the power source;
   a second field current level in which the duty cycle of the voltage reaches when the second load is electrically disconnected from the power source;
   a delay subsequent to a point in time in which the second load is electrically disconnected from the power source; and
   a maximum amount of time in which the voltage is set to the voltage set point.

2. The vehicle of claim 1, wherein adjust the calibration parameter is further based on the second load being electrically coupled to the power source, a determination that the ECU does not generate the fault signal, and the voltage exceeding a vehicle system voltage for a predetermined amount of occurrences before a predetermined amount of time elapses.

3. The vehicle of claim 1, wherein adjust the calibration parameter further comprises:
   compares the current total number of fault signals to a latest saved total number of fault signals; and
   responsive to the current total number of fault signals being less than the latest saved total number of fault signals, adjust said calibration parameter such that at least one aspect of the current adjustment is the same as a prior adjustment of said calibration parameter.

4. The vehicle of claim 3, wherein said aspect comprises:
   an increase or decrease in magnitude of said calibration parameter; and
   an increase or decrease in number of said calibration parameter.

5. The vehicle of claim 1, wherein the power source comprises an alternator.

6. The vehicle of claim 1, further comprising a controller area network (CAN) bus electrically coupling the processor and the second load, wherein the processor is further configured to receive the fault signal via the CAN bus.

7. The vehicle of claim 1, wherein the second load is a snowplow.

8. The vehicle of claim 1, wherein the first loads comprise at least one of: an exterior lighting, an interior lighting, Passive Entry Passive Start (PEPS) system, an infotainment system, an electronic instrument cluster, a body control module (BCM), and a HVAC modules.

9. A method comprising:
   generating, from an electronic control unit (ECU) electrically coupled to a first load of a vehicle, a fault signal indicative of an occurrence of an action performed by the ECU to mitigate a voltage transient event, wherein the action comprises electrically connecting or disconnecting the first load from a power source of the vehicle; and
   adjusting, based on a second load separate from the vehicle being electrically coupled to the power source of the vehicle and based on receiving the fault signal, a calibration parameter, wherein the calibration parameter defines a threshold for controlling a voltage available within the power source, wherein the calibration parameter comprises at least one of:
   a first rate in which the voltage drops when the second load is electrically coupled to the power source;
   a first maximum range in which the voltage drops when the second load is electrically coupled to the power source;
   a first field current level in which a duty cycle of the voltage reaches when the second load is electrically coupled to the power source;
   a voltage set point in which the voltage is maintained subsequent to a voltage drop;
   a second rate in which the voltage rises when the second load electrically disconnected from the power source;
   a second maximum range in which the voltage rises when the second load is electrically disconnected from the power source;
   a second field current level in which the duty cycle of the voltage reaches when the second load is electrically disconnected from the power source;
   a delay subsequent to a point in time in which the second load is electrically disconnected from the power source; and
   a maximum amount of time in which the voltage is set to the voltage set point.

10. The method of claim 9, wherein adjusting the calibration parameter is further based on the second load being electrically coupled to the power source, a determination that the ECU does not generate the fault signal, and the voltage exceeding a vehicle system voltage for a predetermined amount of occurrences before a predetermined amount of time elapses.

11. The method of claim 9, wherein adjusting the calibration parameter further comprises:
   comparing the current total number of fault signals to a latest saved total number of fault signals; and
   responsive to the current total number of fault signals being less than the latest saved total number of fault signals, adjusting said calibration parameter such that at least one aspect of the current adjustment is the same as a prior adjustment of said calibration parameter.

12. The method of claim 11, wherein said aspect comprises:
   an increase or decrease in magnitude of said calibration parameter; and an increase or decrease in number of said calibration parameter.

13. The method of claim 9, wherein the power source comprises an alternator.

14. The method of claim 9, further comprising receiving the fault signal via a a controller area network (CAN) bus electrically coupling a vehicle processor and the second load.

15. The method of claim 9, wherein the second load is a snowplow.

16. The method of claim 9, wherein the first loads comprise at least one of: an exterior lighting, an interior lighting, Passive Entry Passive Start (PEPS) system, an infotainment system, an electronic instrument cluster, a body control module (BCM), and a HVAC modules.

* * * * *